United States Patent
Gu et al.

(10) Patent No.: US 10,201,778 B2
(45) Date of Patent: Feb. 12, 2019

(54) PROCESS FOR SEPARATING CO2 FROM CO2 CONTAINING GAS STREAM

(71) Applicants: China Energy Investment Corporation Limited, Beijing (CN); National Institute of Clean-and-Low-Carbon Energy, Beijing (CN)

(72) Inventors: Youzong Gu, Beijing (CN); Wenqiang Xu, Beijing (CN)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 0 days.

(21) Appl. No.: 15/470,804

(22) Filed: Mar. 27, 2017

(65) Prior Publication Data

US 2018/0207577 A1   Jul. 26, 2018

(30) Foreign Application Priority Data

Jan. 23, 2017   (CN) .......................... 2017 1 0058282

(51) Int. Cl.
  *B01D 53/14*   (2006.01)
  *B01D 53/22*   (2006.01)
  *B01D 53/62*   (2006.01)

(52) U.S. Cl.
  CPC ..... *B01D 53/1475* (2013.01); *B01D 53/1425* (2013.01); *B01D 53/1493* (2013.01);
  (Continued)

(58) Field of Classification Search
  CPC ............ B01D 53/1425; B01D 53/1475; B01D 53/1493; B01D 53/22; B01D 53/226; B01D 53/62; B01D 2257/504; B01D 2317/025
  See application file for complete search history.

(56) References Cited

U.S. PATENT DOCUMENTS 4,264,338 A * 4/1981 Null ..................... B01D 53/226
                                                  95/47
5,306,427 A     4/1994 Xu
(Continued)

FOREIGN PATENT DOCUMENTS

EP          0 596 268        5/1994
WO    WO 20100144523       12/2010
WO    WO 2012/111727        8/2012

*Primary Examiner* — Jason M Greene
(74) *Attorney, Agent, or Firm* — Martin & Ferraro, LLP

(57) ABSTRACT

The invention relates to gas separation, particularly to a process for separating $CO_2$ from a $CO_2$ containing gas stream with varying $CO_2$ concentration using a membrane-based separation system. The process for separating $CO_2$ comprises: (i) feeding the $CO_2$ containing gas stream into a membrane-based separation system comprising one or more membrane stages in-line, each membrane stage producing a $CO_2$-depleted retentate stream and a rich $CO_2$ permeate stream, and (ii) recycling a part of the $CO_2$-rich permeate stream from at least one membrane stage as a recycled stream, into a preceding feed stream of one or more membrane stages in the membrane-based separation system to adjust the $CO_2$ concentration of the feed stream. The process could stabilize the $CO_2$ concentration in the feed steam by recirculation of a fraction of the high purity $CO_2$ permeate to the feed of the membrane system, which would result in a lower incremental auxiliary load than other options such as compression of the entire gas stream.

16 Claims, 2 Drawing Sheets

(52) U.S. Cl.
CPC .......... *B01D 53/62* (2013.01); *B01D 2252/00* (2013.01); *B01D 2257/504* (2013.01)

(56) References Cited

U.S. PATENT DOCUMENTS

| | | | | |
|---|---|---|---|---|
| 5,378,263 | A * | 1/1995 | Prasad | B01D 53/226 95/45 |
| 5,482,539 | A * | 1/1996 | Callahan | B01D 53/226 95/45 |
| 5,538,535 | A * | 7/1996 | Pinnau | B01D 53/22 95/117 |
| 6,168,649 | B1 * | 1/2001 | Jensvold | B01D 53/226 95/47 |
| 2010/0236404 | A1 * | 9/2010 | Baker | B01D 53/22 95/46 |
| 2012/0000355 | A1 * | 1/2012 | Sharma | B01D 53/226 95/12 |
| 2013/0058853 | A1 * | 3/2013 | Baker | B01D 53/22 423/228 |
| 2013/0098242 | A1 * | 4/2013 | Ungerank | B01D 53/226 95/51 |
| 2014/0345457 | A1 | 11/2014 | Balster et al. | |
| 2015/0336046 | A1 * | 11/2015 | Ungerank | B01D 53/22 95/8 |
| 2016/0346727 | A1 * | 12/2016 | Yeo | B01D 53/226 |

* cited by examiner

PROCESS FOR SEPARATING CO2 FROM CO2 CONTAINING GAS STREAM

CROSS REFERENCE TO RELATED APPLICATIONS

This application claims priority to Chinese Application No. 201710058282.4, filed on Jan. 23, 2017, entitled "Process for separating $CO_2$ from $CO_2$ containing gas stream and membrane-based separation system", which is specifically and entirely incorporated by reference.

FIELD OF THE INVENTION

The invention relates to gas separation, particularly to a process for separating $CO_2$ from a $CO_2$ containing gas stream with varying $CO_2$ concentration using a membrane-based separation system.

BACKGROUND OF THE INVENTION

Membrane-based separation technologies have the potential to separate $CO_2$ at reduced costs under certain conditions, relative to other technologies such as solvent-based absorption methods. The performance of membrane-based separation technologies is sensitive to the $CO_2$ concentration in the feed gas, this is because the $CO_2$ concentration directly impacts the driving force for separation.

One use for $CO_2$ separation technologies is in the reduction of $CO_2$ emissions through the capture of $CO_2$ from power plant flue gases. The concentration of $CO_2$ in the flue gas of a power plant can vary over time, depending on various factors such as the operating load of the power plant. For example, when a coal-fired power plant is operated at full capacity, the concentration of $CO_2$ is about 13-14%. When the power plant is operated a lower load, the $CO_2$ concentration in the flue gas can drop below 12%.

For membrane systems, the reduced pressure driving force could increase the cost of $CO_2$ removal, reduce the operating thermal efficiency of the power plant through additional auxiliary loads due to compression or pumping, and, in some cases, compromise the ability to achieve the target levels of $CO_2$ removal. Therefore, dynamic changes in the $CO_2$ concentration, such as those encountered in response to load following can make steady state operation of membrane-based separation systems more difficult.

Efforts to optimize the performance of membrane-based systems for $CO_2$ capture have focused on three general approaches for maximizing the driving force for separation: (1) Increasing the overall pressure of the feed through compression; (2) Decreasing the pressure on the permeate side using vacuum: and (3) Increasing the concentration in the flue gas feed stream using recycle loops. In the first approach, the low concentration of $CO_2$ in flue gas streams typically means that significant compression is required to meaningfully improve performance. This results in high parasitic auxiliary loads and reduced power plant efficiency. The second approach has been used in some designs. However, since the permeate pressure can only be reduced about 1 atmosphere, the improvement in the driving force for separation is limited. The third approach involves recycling part of the retentate to increase the concentration of $CO_2$ in the feed. An example of this is exhaust gas recirculation (EGR), which involves recirculation of the retentate to the combustor, with the effect of increasing the $CO_2$ concentration.

SUMMARY OF THE INVENTION

The object of the present invention is providing a process for separating $CO_2$ from a $CO_2$ containing gas stream with varying $CO_2$ concentration, with an improved controllability and performance of membrane-based separation systems applied to the $CO_2$ containing gas stream where the concentration of $CO_2$ changes over time, as well as a membrane-based separation system.

Therefore, in one aspect, the present invention provides a process for separating $CO_2$ from a $CO_2$ containing gas stream with varying $CO_2$ concentration comprising:

(i) feeding the $CO_2$ containing gas stream with varying $CO_2$ concentration into a membrane-based separation system comprising one or more membrane stages in-line, each membrane stage would obtain a $CO_2$-depleted retentate stream and a $CO_2$-rich permeate stream, and (ii) recycling a part of the $CO_2$-rich permeate stream from at least one membrane stage as a recycled stream, into preceding feed stream of one or more membrane stages in the membrane-based separation system to adjust the $CO_2$ concentration of the feed stream.

In another aspect, the present invention provides a membrane-based separation device comprising one or more membrane stages in-line, wherein permeate line of one or more membrane stages is a multi-way line with at least one line as a recycle line connected to preceding feed line of one or more membrane stages such that a part of $CO_2$-rich permeate stream is recycled into the feed stream to adjust the $CO_2$ concentration of the feed stream.

The process of the present invention could stabilize the $CO_2$ concentration in the $CO_2$ containing gas feed steam by recirculation of a fraction of the high purity $CO_2$ permeate to the feed of the membrane system, which would result in a lower incremental auxiliary load than other options such as compression of the entire gas stream.

Other features and advantages of the present invention will be explained specifically in the following detailed description of the embodiments.

BRIEF DESCRIPTION OF DRAWINGS

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

REFERENCES IN THE DRAWINGS

Figure 1:
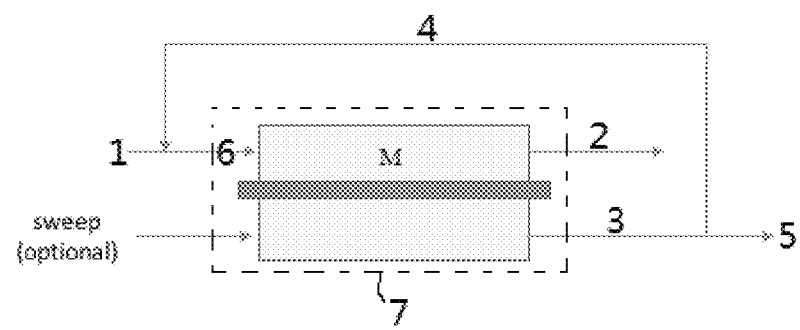
FIG. 1 shows a membrane-based separation system according to a preferred embodiment of the present invention.

1: $CO_2$ containing gas stream; 2: total $CO_2$-depleted retentate line; 3: permeate line; 4: total recycle line; 5: $CO_2$-rich gas product; 6: feed line; 7: membrane-based separation device; M: membrane stage; 2': the first retentate line; 2": the second retentate line; 3': the first permeate line;

3": the second permeate line; 4': the first recycle line; 4": the second recycle line; 6': the first feed line; 6": the second feed line; M1: the first membrane stage; M2: the second membrane stage.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The end points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values can be combined to obtain one or more new numeric ranges, which shall be deemed as having been disclosed specifically in this document.

The present invention provides a process for separating $CO_2$ from a $CO_2$ containing gas stream with varying $CO_2$ concentration comprising:
(i) feeding the $CO_2$ containing gas stream with varying $CO_2$ concentration into a membrane-based separation system comprising one or more membrane stages in-line, each membrane stage would obtain a $CO_2$-depleted retentate stream and a $CO_2$-rich permeate stream, and
(ii) recycling a part of the $CO_2$-rich permeate stream from at least one membrane stage as a recycled stream, into preceding feed stream of one or more membrane stages in the membrane-based separation system to adjust the $CO_2$ concentration of the feed stream.

According to the present invention, although the inventors do not wish the present invention to be bound by any theory, the $CO_2$ concentration could be kept substantially steady by recirculation of a fraction of the high purity $CO_2$ permeate to the feed of the membrane system, which could be verified using a mass balance of the gas stream flows. In this case, advantageously, the flow rate of the recycled stream is adjusted to keep the $CO_2$ concentration in the feed stream to one or more stages of the membrane-based separation system steady, preferably to keep the $CO_2$ concentration in the feed stream to each stage of the membrane-based separation system steady.

According to the present invention, the membrane-based separation system comprises one or more membrane stages in-line. Such a system could comprise a single membrane stage (shown as in FIG. 1), two membrane stages (shown as in FIG. 2), or three or more membrane stages (not shown). The recycled stream may be a part of the $CO_2$-rich permeate stream from at least one membrane stage, for example, in the case of a two stage membrane-based separation system, the recycled stream may be a part of $CO_2$-rich permeate stream from the first membrane stage or a part of $CO_2$-rich permeate stream from the second membrane stage, or both. The recycled stream from the first membrane stage and the recycled stream from the second membrane stage may be used separately, or in combination. However, it should be noted the the recycled stream from the first membrane stage has the same composition as the second feed stream of the second membrane stage (when there is no other recycled gas compensation) since they are both from the first $CO_2$-rich permeate stream of the first membrane stage. Moreover, the $CO_2$ concentration of the later permeate stream is higher than that of the preceding permeate stream, so the recycled stream from the later permeate has a higher $CO_2$ concentration than that of the preceding permeate stream. Typically, the best embodiment is to use a part of the last $CO_2$-rich permeate stream from the last membrane stage as the recycled stream, shown as in FIGS. 1 and 2. Use of part of the last $CO_2$-rich permeate stream from the last membrane stage as the recycled stream simplifies the overall configuration.

In the present invention, terms such as "preceding", "later", "first", "last" etc. depend on the position of the components. For example "recycling a recycled stream into a preceding feed stream" may mean that the inlet of the indicated permeate stream may be positioned in front of the formation site of the recycled stream (the formation site of the recycled stream can be the branch site on the permeate line to form the recycled stream).

According to the present invention, although the recycled stream can be introduced into any feed stream of the membrane stages if there is a fluctuation in the target feed stream, the preferred process is to recycle at least a part of the recycled stream into the first feed stream of the first membrane stage, more preferably only to recycle the recycled stream into the first feed stream of the first membrane stage, most preferably only to recycle the recycled stream from the last permeate stream of the last membrane stage into the first feed stream of the first membrane stage.

According to the present invention, the $CO_2$ containing gas stream may be any type of $CO_2$ containing gas, example of the $CO_2$ containing gas stream may be $CO_2$ containing industrial exhaust gas, such as a flue gas stream produced from power generation using fossil fuels (preferably the fossil fuel is coal), exhaust streams from industrial boilers, exhaust streams from coal-to-chemical processes, gas streams produced from natural gas recovery, etc., the present process is especially suitable for separating $CO_2$ from a flue gas stream.

According to the present invention, the process of the present invention has no special limit on the $CO_2$ concentration of the feed stream, the adjusted $CO_2$ concentration of the feed stream may be reached any desired values. In a preferred embodiment, especially for treating flue gas streams from power generation using coal, the $CO_2$ concentration of the first feed stream is adjusted to 12 mol % or more, more preferably to 12 mol %-15 mol %, most preferably to 13 mol %-14 mol % by the recycled stream.

According to the present invention, one significant aspect of the inventive concept is to use a recycle loop to dynamically compensate for changes in the $CO_2$ concentration of the feed stream. In other words, the recycle rate is higher when the $CO_2$ concentration is below a target level and the recycle rate is lowered when the $CO_2$ concentration is closer to the target level. The primary focus of previous efforts has been to raise the overall concentration, without regard to transients in the $CO_2$ concentration over time. Preferably, the flow rate of the recycled $CO_2$-rich permeate stream is adjusted based on direct measurements of the $CO_2$ concentration of the feed stream, or based on upstream parameters according to which the $CO_2$ containing gas stream is generated including: operational parameters of the plant where the $CO_2$ containing gas stream is generated (such as fuel feed rate, air flow rate, electrical output etc.), or operational parameters related to upstream emissions controls of the $CO_2$ containing gas stream (such as $CO_2$ components, chemical feed rates, water content etc.).

In a preferred embodiment of the present invention, the flow rate of the recycled stream is 70 mol % or less, preferably 25 mol %-70 mol %, more preferably 30 mol %-65 mol % of the total content of the last $CO_2$-rich permeate stream.

According to the present invention, it is clear that the present process is to use permeate, rather than retentate stream, in the recycle loop. Previously known methods of recycle focus on recirculation of the retentate. The benefits of recycling permeate are not obvious when considering only the auxiliary loads, since recycling would increase the energy required per net unit of $CO_2$ separated. However, the prior art does not consider the benefits in operational simplicity enabled by stabilizing the feed concentration in this manner. Moreover, the use of a permeate recycle to produce a steady concentration feed offers the potential for energy savings relative to alternate approaches of compensating for lower concentrations such as compression, since compression-based solutions would require compressing the entire gas stream. Finally, the use of the permeate means that the total volume of the feed stream is not significantly increased, such as the recycled stream enables the total content of the feed stream to be increased by 15 mol % or less, preferably by 10 mol % or less, more preferably by 3 mol %-8 mol %.

Together, these aspects of the present invention allow the possibility of achieving the performance benefits with a fraction of the incremental energy load of known approaches.

The process according to the present invention has no special limit to the membrane-based separation system, any common types of the membrane-based separation system capable of separating $CO_2$ in the art can be used in the present process unless the membrane-based separation system comprises a recyle loop as described above. The membrane may be employed in plate and frame form, or may comprise spiral wound membranes, tubular membranes, hollow fiber membranes, or the like. It will be appreciated that, when membranes are used in tubular or hollow fiber form, a plurality of such membranes can conventionally be arranged in parallel bundle form. In such embodiments, the feed gas stream can be brought into contact with either the outer or shell side, or the inner or tube side of the membrane particles. Typical of the types of membrane materials utilized in membrane separation processes include organic polymeric materials or such organic polymeric materials mixed with inorganic materials such as fillers, reinforcements and the like. Organic polymers that may be considered for various practical commercial operations include such materials as polysulfones; polystyrenes; including such styrene-containing polymers as acrylonitrile, styrene copolymers, styrene-butadiene and styrene-vinylbenzyl halide copolymers; cellulosic polymers, such as cellulose acetate, cellulose acetate-butyrate, methyl or ethyl cellulose: polyamides and polyimides; polycarbonates; polyurethanes, polyesters, including polyacrylates, polyethylene: polypropylene; polyvinyl pyridines, and the like. Such polymers may be either substituted or unsubstituted, with typical substituents of such substituted polymers including halogens, such as chlorine, fluorine and bromine; hydroxyl groups: lower alkyl groups; lower alkoxy groups; monocyclic aryl; lower acyl groups, etc.

The process according to the present invention has no special limit to the $CO_2$ recovery rate of the membrane system; the recovery rate can be any desired value. Preferably, the overall $CO_2$ recovery rate is 50% or more, more preferably 60%-90%, such as 60%, 65%, 70%, 75%, 80%, 85%, or 90%. In addition, the concentration of $CO_2$ in the permeate stream obtained by the present process may be any desired value. Preferably, the concentration of $CO_2$ in the last permeate stream is 60 mol % or above, more preferably 80 mol % or above, further more preferably 90 mol % or above, most preferably 95 mol % or above. It would be appreciated that the overall $CO_2$ recovery rate and $CO_2$ concentration in the permeate stream obtained in the present process is comparable to processes known in the prior art.

In another aspect, the present invention provides a membrane-based separation device comprising one or more membrane stages in-line, wherein at least one permeate line of the membrane stages is a multi-way line with at least one line as a recycle line connected to preceding feed line of one or more membrane stages such that a part of $CO_2$-rich permeate stream is recycled into the feed stream to adjust the $CO_2$ concentration of the feed stream.

The membrane-based separation device herein can be used in the abovementioned process, thus the corresponding description would be included in the membrane-based separation device by reference.

As depicted above, the membrane-based separation device may just comprise a single membrane stage (shown as in FIG. 1), two membrane stages (shown as in FIG. 2), or three or more membrane stages (not shown). The device could use a normal device but with a novel recycle loop. The recycle loop can be formed in any structure as long as it provides a recycle stream derived from a permeate stream into a preceding feed stream, so to establish the present process.

In a preferred embodiment shown in FIG. 1, the membrane-based separation system comprises a membrane-based separation device 7 with one membrane stage M, a feed line 6 connected with a $CO_2$ containing gas stream inlet of the membrane-based separation device 7, a retentate line 2 connected with a $CO_2$-depleted retentate stream outlet of the membrane-based separation device 7, and a permeate line 3 connected with a $CO_2$-rich permeate stream outlet of the membrane-based separation device 7, while the permeate line 3 is a two-way line with one line as a recycle line 4 connected to the feeding line 6 such that a part of the $CO_2$-rich permeate stream as recycled stream is recycled into the feed stream to adjusting the $CO_2$ concentration of the feed stream. By using the system shown in FIG. 1, the $CO_2$ containing gas stream 1 would combine with the recycled stream from recycle line 4 to form the feed stream, and the combination of the $CO_2$ containing gas stream 1 and the recycled stream that is the feed stream would be fed into the membrane stage M through feed line 6. The $CO_2$ in the feed stream would selectively permeate through the membrane disposed in the membrane stage M to form an $CO_2$-rich gas. The $CO_2$-rich gas would pass through a $CO_2$-rich permeate stream outlet of the membrane-based separation device 7 into the permeate line 3 to obtain a permeate stream. Part of the permeate stream is diverted into recycle line 4 to be used as the recycle stream, while the rest of the permeate stream would be removed from the membrane-based separation system to be a $CO_2$-rich gas product 5.

Figure 2:
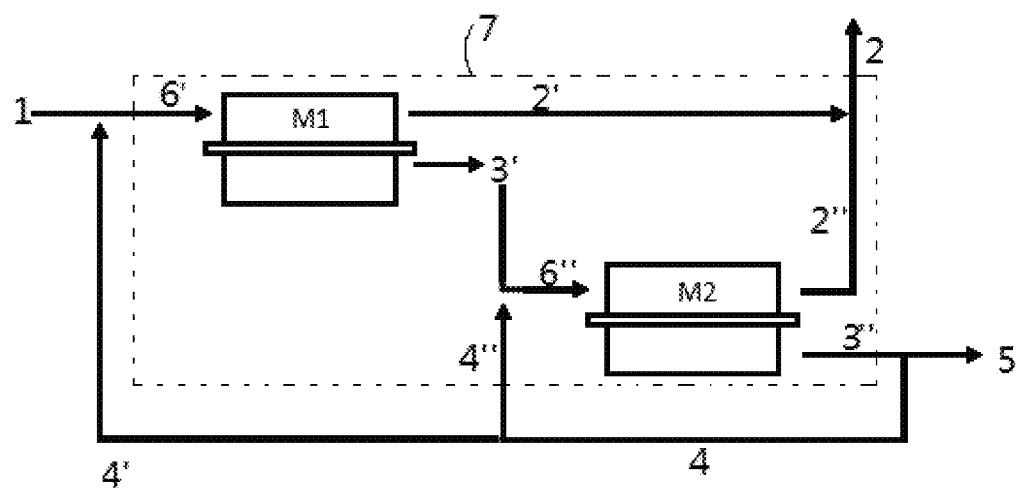
FIG. 2 shows a membrane-based separation system according to another preferred embodiment of the present invention.

In another preferred embodiment shown in FIG. 2, the membrane-based separation system comprises a membrane-based separation device 7 with two membrane stages, i.e. a first membrane stage M1 and a second membrane stage M2, a first feed line 6' connected with a $CO_2$ containing gas stream inlet of the first membrane stage M1, a first retentate line 2' connected with a $CO_2$-depleted retentate stream outlet of the first membrane stage M1, a first permeate line 3' connected with a $CO_2$-rich permeate stream outlet of the first membrane stage M1, the downstream line of line 3' is defined as a second feed line 6" connected with a gas inlet of the second membrane stage M2, a second retentate line 2" connected with a $CO_2$-depleted retentate stream outlet of the second membrane stage M2 and a second permeate line 3" connected with a $CO_2$-rich permeate stream outlet of the second membrane stage M2, wherein the second permeate line 3" is a two-way line with one line as a total recycle line 4 and another line to output $CO_2$-rich gas product 5. Advantageously, the total recycle line 4 is divided into two lines, one is a first recycle line 4' connected with the first feed line 6' such that a part of the $CO_2$-rich permeate stream provided by the second membrane stage M2 is recycled into the first feed stream (initial feed steam) to adjust the $CO_2$ concentration of the first feed stream, and another one is a second recycle line 4" connected with the second feed line 6" such that a part of the $CO_2$-rich permeate stream provided by the second membrane stage M2 is recycled into the feed stream of stage M2 to adjust the $CO_2$ concentration of the this feed stream. Otherwise, the first retentate line 2' and second retentate line 2" would joined together to form a total retentate line 2 through which the total $CO_2$-depleted retentate stream is output the membrane-based separation system. By using the system shown in FIG. 2, the $CO_2$ containing gas stream 1 would combine with a recycled stream from the first recycle line 4' to form a first feed stream (initial feed stream), and the combination of the $CO_2$ containing gas stream 1 and the recycled stream would be fed into the first membrane stage M1 through the first feed line 6', then $CO_2$ in the feed stream would pass through the membrane disposed in the stage M1 to form a $CO_2$-rich gas, the retentate stream would flow into the first retentate line 2', while the $CO_2$-rich gas would pass through an CO-rich permeate stream outlet of the stage M1 into the first permeate line 3' to obtain a permeate stream, the permeate stream would combine with a recycle stream from the second recycle line 4" to form a feed stream into the second membrane stage M2 through the second feed line 6" which actually is the downstream line of the line 3', then $CO_2$ in the feed stream would selectively pass through the membrane disposed in the stage M2 to form a $CO_2$-rich gas, the retentate stream would flow into the second retentate line 2" to combine with the retentate stream from line 2', and the combined stream would be output through the line 2, while the $CO_2$-rich gas would pass through an $CO_2$-rich permeate stream outlet of the stage M2 into the second permeate line 3" to obtain a permeate stream, a part of the permeate stream would flow into recycle line 4 used as the recycle stream separately into recycle line 4' and line 4", the rest of the permeate stream would be removed from the membrane-based separation system to be a $CO_2$-rich gas product 5.

Hereunder the present invention will be detailed in embodiments.

EXAMPLE 1

A preferred embodiment using a single stage membrane system is shown in FIG. 1. The performance is summarized in Table 1. Calculations were performed to determine the mass flows in each stream, the overall $CO_2$ recovery in the membrane stage, the overall $CO_2$ capture rate, the recycle rate required to stabilize the feed flow at the set point (in this case 13.5 mol %), the increase in flow rate to the membrane stage, and the required $CO_2/N_2$ selectivity to produce a 95 mol % $CO_2$ permeate stream. To simplify the calculation, the feed stream is assumed to be a mixture of $CO_2$ and $N_2$ at temperature and pressure consistent with a power plant flue gas stream.

It should be noted, in the following description, stream 2 to stream 4 and stream 6 are corresponding to the streams in the relevant lines shown in FIG. 1 such as stream 2 is the stream in line 2.

"Inlet feed $CO_2$ concentration" refers to the $CO_2$ concentration of the feed stream without combining with a recycle stream.

"$CO_2$ recovery by the membrane stage" refers to percentage ratio of the $CO_2$ amount passing through the membrane disposed in the membrane stage to the total $CO_2$ amount in the feed stream into the membrane stage.

"Overall $CO_2$ capture rate" means percentage ratio of the $CO_2$ amount in the rich $CO_2$ product (product 5) to the $CO_2$ amount of the $CO_2$ containing gas stream (stream 1).

"Recycle rate required" refers to percentage ratio of the flow rate of the recycle stream to the flow rate of the relevant permeate stream.

"Increase in flow rate of feed" refers to percentage ratio of flow rate of the recycle stream combining with the feed stream to the flow rate of the feed stream (stream 1) without combining with a recycle stream.

TABLE 1

Summary table for Example 1.

|  | Inlet feed $CO_2$ concentration [% mol] | $CO_2$ recovery by the membrane stage [%] | Overall $CO_2$ capture rate [%] | Recycle rate required [%] | Increase in flow rate of feed [%] | Required $CO_2/N_2$ selectivity* |
|---|---|---|---|---|---|---|
| Case 1A | 13.5% | 90% | 90% | 0% | 0% | 121 |
|  | 10% | 90% | 90% | 0% | 0% | 170 |
|  | 7% | 90% | 90% | 0% | 0% | 250 |
| Case 1B | 10% | 70% | 70% | 0% | 0% | 170 |
|  | 7% | 50% | 50% | 0% | 0% | 250 |
| Case 2 | 10% | 93% | 90% | 31% | 4% | 122 |
|  | 7% | 95% | 90% | 54% | 8% | 122 |
| Case 3 | 10% | 90% | 86% | 31% | 4% | 122 |
|  | 7% | 90% | 79% | 59% | 8% | 120 |
| Case 4 | 10% | 75% | 65% | 38% | 4% | 122 |
|  | 7% | 83% | 65% | 62% | 8% | 122 |

*For 95 mol % purity $CO_2$ product

Case 1A is a baseline configuration for a coal-fired power plant producing a constant volume of flue gas with three levels of $CO_2$. The flue gas is sent to a membrane system which is operated in a manner that captures 90% of the $CO_2$. The $CO_2/N_2$ membrane selectivities required to achieve a 95% pure $CO_2$ permeate stream are listed. Note that the membrane selectivity requirement needed to achieve a given purity level increases as the feed $CO_2$ concentration decreases. This is a comparative baseline for assessing the performance of the other cases. The permeate is not recycled. The molar mass flow rates for the streams are listed in Table 2.

TABLE 2

| Stream | Flow [kg · mol/hr] | $CO_2$ concentration [% mol] | $N_2$ concentration [% mol] | $CO_2$ flow [kg · mol/hr] | $N_2$ flow [kg · mol/hr] |
|---|---|---|---|---|---|
| 13.5% feed | | | | | |
| 1 | 74091 | 13.5% | 87% | 10002 | 64089 |
| 2 | 64612 | 2% | 98% | 1000 | 63612 |
| 3 | 9479 | 95% | 5% | 9002 | 477 |
| 4 | 0 | 0% | 0% | 0 | 0 |
| 5 | 9479 | 95% | 5% | 9002 | 477 |
| 6 | 74091 | 14% | 87% | 10002 | 64089 |
| 10% feed | | | | | |
| 1 | 74091 | 10% | 90% | 7409 | 66682 |
| 2 | 67070 | 1% | 99% | 741 | 66329 |
| 3 | 7021 | 95% | 5% | 6668 | 353 |
| 4 | 0 | 0% | 0% | 0 | 0 |
| 5 | 7021 | 95% | 5% | 6668 | 353 |
| 6 | 74091 | 10% | 90% | 7409 | 66682 |
| 7% feed | | | | | |
| 1 | 74091 | 7% | 93% | 5186 | 68905 |
| 2 | 69175 | 1% | 99% | 519 | 68657 |
| 3 | 4916 | 95% | 5% | 4668 | 248 |
| 4 | 0 | 0% | 0% | 0 | 0 |
| 5 | 4916 | 95% | 5% | 4668 | 248 |
| 6 | 74091 | 7% | 93% | 5186 | 68905 |

Case 1B is a second comparative example for the same power plant configuration as Case 1A, producing a constant volume of flue gas with two reduced levels of $CO_2$. The flue gas is sent to a membrane system which is operated at approximately the same conditions for all three levels of $CO_2$ concentration. Under these conditions, the membrane system is expected to perform at lower total recovery for lower $CO_2$ concentrations, due to the lower driving force for separation. Assuming the membrane system separation efficiency scales with the $CO_2$ concentration, the effectiveness drops from 90% with 13.5% $CO_2$ in the flue gas to about 70% and 50% recovery for flue gas with 10% and 7% $CO_2$, respectively. In these cases, no additional measures are taken to improve the membrane-based separation system and the overall $CO_2$ capture rate is reduced from 90% to 70% and 50%, respectively. As with Case 1A, the permeate is not recycled. The molar mass flow rates for the streams are listed in Table 3.

TABLE 3

| Stream | Flow [kg · mol/hr] | $CO_2$ concentration [% mol] | $N_2$ concentration [% mol] | $CO_2$ flow [kg · mol/hr] | $N_2$ flow [kg · mol/hr] |
|---|---|---|---|---|---|
| 10% feed | | | | | |
| 1 | 74091 | 10% | 90% | 7409 | 66682 |
| 2 | 68864 | 4% | 96% | 2445 | 66419 |
| 3 | 5227 | 95% | 5% | 4964 | 263 |
| 4 | 0 | 0% | 0% | 0 | 0 |
| 5 | 5227 | 95% | 5% | 4964 | 263 |
| 6 | 74091 | 10% | 90% | 7409 | 66682 |
| 7% feed | | | | | |
| 1 | 74091 | 7% | 93% | 5186 | 68905 |
| 2 | 71251 | 3% | 97% | 2489 | 68761 |
| 3 | 2840 | 95% | 5% | 2697 | 143 |
| 4 | 0 | 0% | 0% | 0 | 0 |
| 5 | 2840 | 95% | 5% | 2697 | 143 |
| 6 | 74091 | 7% | 93% | 5186 | 68905 |

Case 2 is a configuration where recycle streams are used for the cases of flue gas with 10% and 7% $CO_2$ concentration to boost the effective concentration of $CO_2$ in stream 6 to 13.5%. The membrane-based separation system still maintains an overall 90% recovery of $CO_2$. The recycle rates needed to stabilize the inlet $CO_2$ concentration of the feed stream 6 to membrane stage M when the $CO_2$ concentration in overall inlet stream 1 drops to the 10% and 7% levels are about 31% and 54% of the permeate stream, respectively. Given the concentrated nature of the recycle stream, the flow of Stream 6 is only increased about 4% and 8%, respectively, relative to the flue gas feed Stream 1. The use of the recycle reduces the $CO_2/N_2$ selectivities required to achieve the target purity to levels comparable to that needed for a feed with 13.5% $CO_2$ concentration. However, to maintain an overall $CO_2$ capture rate of 90%, the membrane system must recover a higher fraction of the $CO_2$ from stream 6 to close the mass balance. The required recovery of the $CO_2$ by the membrane system increases from 90% to 93% and 95%, respectively. This indicates that the membrane stage M must be operated more aggressively to maintain the same overall $CO_2$ capture rate. In membrane systems, higher stage cuts are generally accompanied by increased membrane area requirements and capital costs. In this case, a beneficial trade-off is a relaxed membrane selectivity requirement. The molar mass flow rates for the streams are listed in Table 4.

TABLE 4

| Stream | Flow [kg · mol/hr] | $CO_2$ concentration [% mol] | $N_2$ concentration [% mol] | $CO_2$ flow [kg · mol/hr] | $N_2$ flow [kg · mol/hr] |
|---|---|---|---|---|---|
| 10% feed | | | | | |
| 1 | 74091 | 10% | 90% | 7409 | 66682 |
| 2 | 67072 | 1% | 99% | 741 | 66331 |
| 3 | 10154 | 95% | 5% | 9646 | 508 |
| 4 | 3135 | 95% | 5% | 2978 | 157 |
| 5 | 7019 | 95% | 5% | 6668 | 351 |
| 6 | 77226 | 13% | 87% | 10387 | 66839 |
| 7% feed | | | | | |
| 1 | 74091 | 7% | 93% | 5186 | 68905 |
| 2 | 69178 | 1% | 99% | 519 | 68659 |
| 3 | 10774 | 95% | 5% | 10236 | 539 |
| 4 | 5861 | 95% | 5% | 5568 | 293 |
| 5 | 4913 | 95% | 5% | 4668 | 246 |
| 6 | 79952 | 13% | 87% | 10754 | 69198 |

Case 3 is the same configuration as Case 2. The difference is that the membrane system is operated to recover 90% of the $CO_2$ fed to it. The overall $CO_2$ capture rate is allowed to drop to satisfy the mass balance. As with Case 2, recycle streams are added to the cases of flue gas with 10% and 7% $CO_2$ to boost the effective concentration of $CO_2$ in stream 6 to 13.5%. The recycle rates needed to stabilize the inlet $CO_2$ concentration of the feed stream 6 to membrane stage M when the $CO_2$ concentration in overall inlet stream 1 drops to the 10% and 7% levels are about 31% and 59% of the permeate stream, respectively. Given the concentrated nature of the recycle stream, the flow of Stream 6 is only increased about 4% and 8% relative to the flue gas feed Stream 1. As with Case 2, the use of the recycle reduced the $CO_2/N_2$ selectivities required to achieve the target purity to levels comparable to that needed for a feed with 13.5% $CO_2$ concentration. With a membrane system recovery of 90%, the total $CO_2$ capture rates are 86 and 79%, respectively. In this scenario, lower levels of $CO_2$ capture are attained. However, these levels of capture are higher than the membrane-based system recovery levels estimated in comparative example 1B. The molar mass flow rates for the streams are listed in Table 5.

TABLE 5

| Stream | Flow [kg·mol/hr] | $CO_2$ concentration [% mol] | $N_2$ concentration [% mol] | $CO_2$ flow [kg·mol/hr] | $N_2$ flow [kg·mol/hr] |
|---|---|---|---|---|---|
| 10% feed | | | | | |
| 1 | 74091 | 10% | 90% | 7409 | 66682 |
| 2 | 67385 | 1% | 98% | 741 | 66347 |
| 3 | 9840 | 95% | 5% | 9348 | 492 |
| 4 | 3135 | 95% | 5% | 2978 | 157 |
| 5 | 6706 | 95% | 5% | 6370 | 335 |
| 6 | 77226 | 13% | 87% | 10387 | 66839 |
| 7% feed | | | | | |
| 1 | 74091 | 7% | 93% | 5186 | 68905 |
| 2 | 69785 | 1% | 98% | 519 | 68689 |
| 3 | 10380 | 95% | 5% | 9861 | 519 |
| 4 | 6074 | 95% | 5% | 5770 | 304 |
| 5 | 4306 | 95% | 5% | 4091 | 215 |
| 6 | 80165 | 14% | 86% | 10956 | 69208 |

Case 4 is a configuration operated at an overall $CO_2$ capture rate of 65%. This level of $CO_2$ capture could allow a coal-fired power plant to approach a natural gas-fired combined cycle plant in terms of specific $CO_2$ emissions per unit of energy generated. As with cases 2 and 3, recycle streams are added to the cases of flue gas with 10% and 7% $CO_2$ to boost the effective concentration of $CO_2$ in stream 6 to 13.5%. The recycle rates needed to stabilize the inlet $CO_2$ concentration of the feed stream 6 to membrane stage M when the $CO_2$ concentration in overall inlet stream 1 drops to the 10% and 7% levels are about 38% and 62% of the permeate stream, respectively. Given the concentrated nature of the recycle stream, the flow of Stream 6 is only increased about 4% and 8% relative to the flue gas feed Stream 1. The required membrane system recovery rate needed to achieve 65% capture rate is 75% and 83% recovery of $CO_2$ from the feed streams containing 10% and 7% $CO_2$, respectively. As with Cases 2 and 3, the use of the recycle reduced the $CO_2/N_2$ selectivities required to achieve the target purity to levels comparable to that needed for a feed with 13.5% $CO_2$ concentration. The molar mass flow rates for the streams are listed in Table 6.

TABLE 6

| Stream | Flow [kg·mol/hr] | $CO_2$ concentration [% mol] | $N_2$ concentration [% mol] | $CO_2$ flow [kg·mol/hr] | $N_2$ flow [kg·mol/hr] |
|---|---|---|---|---|---|
| 10% feed | | | | | |
| 1 | 74091 | 10% | 90% | 7409 | 66682 |
| 2 | 69022 | 4% | 96% | 2593 | 66428 |
| 3 | 8204 | 95% | 5% | 7794 | 410 |
| 4 | 3135 | 95% | 5% | 2978 | 157 |
| 5 | 5069 | 95% | 5% | 4816 | 253 |
| 6 | 77226 | 13% | 87% | 10387 | 66839 |
| 7% feed | | | | | |
| 1 | 74091 | 7% | 93% | 5186 | 68905 |
| 2 | 70542 | 3% | 97% | 1815 | 68727 |
| 3 | 9410 | 95% | 5% | 8939 | 470 |
| 4 | 5861 | 95% | 5% | 5568 | 293 |
| 5 | 3549 | 95% | 5% | 3371 | 177 |
| 6 | 79952 | 13% | 87% | 10754 | 69198 |

EXAMPLE 2

A second preferred embodiment is shown in FIG. 2. This embodiment illustrates the invention when applied to multi-stage systems. In this example, two stages are used. Cascades of membranes are known in the prior art for gas separations, but the use of a recycle of the permeate has not been described for the purpose of stabilizing the inlet feed concentration. The introduction of multiple stages opens up a degree of freedom in that the permeate can be recycled to any given stage, or a combination thereof. The following cases illustrates the trade-offs for a two stage idealized system, where the permeate is recycled to the first stage or the second stage. Mass balances are used to illustrate the key relationships, and one skilled in the art could use more detailed modeling to optimize configurations in this manner. The flow rates are normalized to 100 mol/s total feed to simplify the presentation of the results.

Calculations were performed to estimate the membrane stage recoveries and selectivities (designated M1 for stage 1 and M2 for stage 2) needed to meet overall separation system performance requirements. For cases 5 to 7 below, the targets are 65% recovery of the input $CO_2$ at a purity of 95%. To simplify the calculation, the feed stream is assumed to be a mixture of $CO_2$ and $N_2$ at temperature and pressure consistent with a power plant flue gas stream. For illustrative purposes, the calculations were performed assuming feed $CO_2$ concentrations of 14%, 10% and 8%. The results are summarized in Table 7.

It should be noted, in the following description, stream 2' to stream 4', stream 2" to stream 4", stream 6' and stream 6", and streams 2 and 4 are corresponding to the streams in the relevant lines shown in FIG. 2 such as stream 2' is the stream in line 2'. The corresponding term definition can be the same as described in example 1.

TABLE 7

| | Inlet feed $CO_2$ concentration [% mol] | $CO_2$ recovery in M1 [%] | $CO_2$ recovery in M2 [%] | Overall $CO_2$ capture rate [%] | Recycle rate required to M1 [%] | Increase in flow rate of feed to M1 [%] | Required $CO_2/N_2$ selectivity for M1 | Recycle rate required to M2 [%] | Increase in flow rate of feed to M2 [%] | Required $CO_2/N_2$ selectivity for M2 |
|---|---|---|---|---|---|---|---|---|---|---|
| Case 5 | 14% | 90% | 72% | 65% | 0% | 0% | 10 | 0% | 0% | 11 |
| | 10% | 90% | 72% | 65% | 0% | 0% | 10 | 0% | 0% | 16 |
| | 8% | 90% | 72% | 65% | 0% | 0% | 10 | 0% | 0% | 20 |
| Case 6 | 10% | 90% | 85% | 65% | 45% | 6% | 10 | 0% | 0% | 7 |

Case 5 is a baseline case for a two stage membrane system. The flue gas is sent to a membrane system which is operated in a manner that separates 90% of the $CO_2$. No recycle is used. Table 8 shows stream compositions for a system fed by mass flows typical for a coal-fired power plant producing a constant volume of flue gas with three levels of $CO_2$. In all three examples the system is operated with a M1 $CO_2$ recovery of 90% and M2 $CO_2$ recovery of 72%. This gives an overall $CO_2$ capture rate of 65%. It should be noted that other combinations of M1 and M2 recovery can be used to achieve the same overall capture rate. The values selected for these examples are for illustrative purposes to show the degree of recycle required to satisfy the mass balances needed to achieve stabilization of the inlet $CO_2$ concentration.

TABLE 8

| Stream | Flow · total [mol/s] | $CO_2$ concentration [% mol] | $N_2$ concentration [% mol] | Flow $CO_2$ [mol/s] | Flow $N_2$ [mol/s] |
|---|---|---|---|---|---|
| 14% feed | | | | | |
| 1 | 100 | 14% | 86% | 14 | 86 |
| 6' | 100 | 14% | 86% | 14 | 86 |
| 2' | 70 | 1% | 99% | 0.7 | 70 |
| 3' | 30 | 45% | 55% | 13 | 16 |
| 6" | 30 | 45% | 55% | 13 | 16 |
| 2" | 16 | 4% | 96% | 0.7 | 16 |
| 2 | 87 | 2% | 98% | 1.4 | 85 |
| 3" | 13 | 95% | 5% | 13 | 1 |
| 4" | 0 | / | / | 0 | 0 |
| 5 | 13 | 95% | 5% | 13 | 1 |
| 4' | 0 | / | / | 0 | 0 |
| 10% feed | | | | | |
| 1 | 100 | 10% | 90% | 10 | 90 |
| 6' | 100 | 10% | 90% | 10 | 90 |
| 2' | 83 | 1% | 99% | 1.0 | 82 |
| 3' | 17 | 53% | 47% | 9.0 | 8.1 |
| 6" | 17 | 53% | 47% | 9.0 | 8.1 |
| 2" | 10 | 25% | 75% | 2.5 | 7.7 |
| 2 | 93 | 4% | 96% | 3.5 | 90 |
| 3" | 7 | 95% | 5% | 6.5 | 0.4 |
| 4" | 0 | / | / | 0 | 0 |
| 5 | 7 | 95% | 5% | 6.5 | 0.4 |
| 4' | 0 | / | / | 0 | 0 |
| 8% feed | | | | | |
| 1 | 100 | 8% | 92% | 8.0 | 92 |
| 6' | 100 | 8% | 92% | 8.0 | 92 |
| 2' | 85 | 1% | 99% | 0.8 | 84 |
| 3' | 15 | 47% | 53% | 7.2 | 8.3 |
| 6" | 15 | 47% | 53% | 7.2 | 8.3 |
| 2" | 10 | 20% | 80% | 2.0 | 8.0 |
| 2 | 95 | 3% | 97% | 2.8 | 92 |
| 3" | 5 | 95% | 5% | 5.2 | 0.3 |
| 4" | 0 | / | / | 0 | 0 |
| 5 | 5 | 95% | 5% | 5.2 | 0.3 |
| 4' | 0 | / | / | 0 | 0 |

Figure 3:
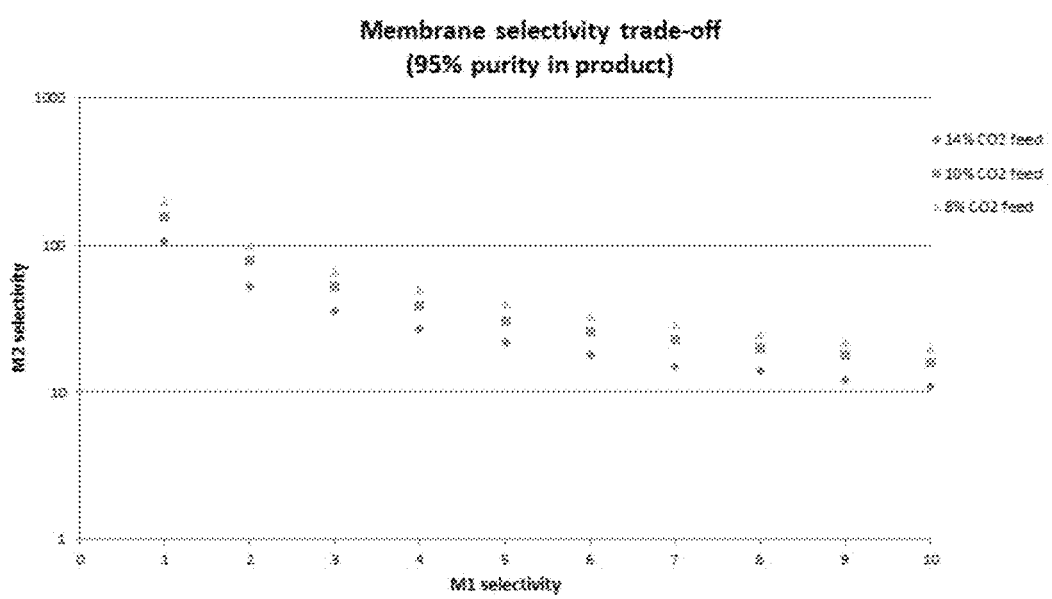
FIG. 3 shows the relationship between M1 and M2 needed to produce a final product stream with 95% $CO_2$ concentration.

The $CO_2/N_2$ selectivities of the two stages are coupled. In general, there is a trade-off between M1 and M2, where the required M2 decreases as M1 increases. FIG. 3 shows the relationship between M1 and M2 needed to produce a final product stream with 95% $CO_2$ concentration. As the $CO_2$ concentration in the feed drops from 14% to 10% or to 8%, the membrane stage $CO_2/N_2$ selectivity requirements become more stringent. Table 8 lists one set of M1 and M2 $CO_2/N_2$ selectivities needed to satisfy the mass balance. Other combinations are possible, as shown in FIG. 3.

Case 6 is a configuration where the permeate stream from M2 is recycled to the feed of M1. A mass balance showing flows for the case of a 10% $CO_2$ feed, with 65% $CO_2$ capture rate and a 95% $CO_2$ product stream is shown in Table 9. This level of $CO_2$ capture could allow a coal-fired power plant to approach a natural gas-fired combined cycle plant in terms of specific $CO_2$ emissions per unit of energy generated. In this example, an inlet concentration set point of 14% mol $CO_2$ was selected. A recycle stream is added to the case of flue gas with 10% $CO_2$ to boost the effective concentration of $CO_2$ in stream 6' to the setpoint value of 14%. The recycle rates needed to stabilize the inlet $CO_2$ concentration of the feed stream 6' to membrane stage M1 when the $CO_2$ concentration in overall inlet stream 1 drops to the 10%-level is about 45% of the permeate stream. Given the concentrated nature of the recycle stream, the flow of Stream 6' is only increased about 6% relative to the flue gas feed Stream 1. One set of required M1 and M2 selectivities needed to achieve 65% capture rate are 10 and 7. Compared to Case 5, the selectivities needed in the Case 6 example are significantly lower than those required to achieve a comparable level of purity using a single stage system. However, the membrane stages M1 and M2 must be operated more aggressively to maintain the same overall $CO_2$ capture rates.

TABLE 9

| 10% feed Stream | Flow · total [mol/s] | $CO_2$ concentration [% mol] | $N_2$ concentration [% mol] | Flow $CO_2$ [mol/s] | Flow $N_2$ [mol/s] |
|---|---|---|---|---|---|
| 1 | 100 | 10% | 90% | 10 | 90 |
| 6' | 106 | 14% | 86% | 15 | 91 |
| 2' | 84 | 2% | 98% | 1.5 | 82 |
| 3' | 22 | 62% | 38% | 14 | 8.2 |
| 6" | 22 | 62% | 38% | 14 | 8.2 |
| 2" | 9 | 22% | 78% | 2.0 | 7.2 |
| 2 | 93 | 4% | 96% | 3.5 | 90 |
| 3" | 12 | 92% | 8% | 11.5 | 1.0 |
| 4" | 0 | / | / | 0 | 0 |
| 5 | 7 | 95% | 5% | 6 | 0.4 |
| 4' | 6 | 89% | 11% | 5.0 | 0.6 |

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be appreciated that the technical features described in the above embodiments can be combined in any appropriate manner, provided that there is no conflict among the technical features in the combination. To avoid unnecessary iteration, such possible combinations are not described here in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A process for separating $CO_2$ from a $CO_2$ containing gas stream with varying $CO_2$ concentration in time comprising:
   (i) feeding the $CO_2$ containing gas stream with varying $CO_2$ concentration into a membrane-based separation system comprising one or more membrane stages in-line, each membrane stage producing a $CO_2$-depleted retentate stream and a $CO_2$-rich permeate stream, and
   (ii) recycling a part of the $CO_2$-rich permeate stream of one or more membrane stages as a recycled stream, into a preceding feed stream of one or more membrane stages in the membrane-based separation system to adjust the $CO_2$ concentration of the feed stream to keep the $CO_2$ concentration in the feed stream to one or more of stages of the membrane-based separation system steady, the flow rate of the recycled stream is adjusted based on measurements of the $CO_2$ concentration of the feed stream, or the flow rate of the recycled stream is adjusted based on upstream parameters in accordance with which the $CO_2$ containing gas stream is generated including: operational parameters of the plant where the $CO_2$ containing gas stream is generated, or operational parameters related to upstream emissions controls of the $CO_2$ containing gas stream.

2. The process according to claim 1 wherein the $CO_2$ containing gas stream is a flue gas stream produced from power generation using fossil fuels.

3. The process according to claim 2, wherein the fossil fuel is coal.

4. The process according to claim 1 further comprising using a part of the last $CO_2$-rich permeate stream from the last membrane stage as the recycled stream.

5. The process according to claim 1 further comprising recycling at least a part of the recycled stream into the first feed stream of the first membrane stage.

6. The process according to claim 5 wherein the $CO_2$ concentration of the first feed stream is adjusted to 12 mol % or more by the recycled stream.

7. The process according to claim 6 wherein the $CO_2$ concentration of the first feed stream is adjusted to 12 mol % - 15 mol % by the recycled stream.

8. The process according to claim 1 wherein the flow rate of the recycled stream is 70 mol % or less based on total content of the last $CO_2$-rich permeate stream.

9. The process according to claim 8 wherein the flow rate of the recycled stream is 25 mol % - 70 mol % based on total content of the last $CO_2$-rich permeate stream.

10. The process according to claim 9 wherein the flow rate of the recycled stream is 30 mol % - 65 mol % based on total content of the last $CO_2$-rich permeate stream.

11. The process according to claim 1 wherein the recycled stream enables the total content of the feed stream to be increased by 15 mol % or less.

12. The process according to claim 1 wherein overall $CO_2$ recovery rate is 50% or more.

13. The process according to claim 12 wherein the overall $CO_2$ recovery rate is 60% - 90%.

14. The process according to claim 1 wherein the concentration of $CO_2$ in the last permeate stream is 60 mol % or above.

15. The process according to claim 14 wherein the concentration of $CO_2$ in the last permeate stream is 90 mol % or above.

16. The process according to claim 14 wherein the concentration of $CO_2$ in the last permeate stream is 95 mol % or above.

* * * * *